(12) United States Patent
Ølmheim et al.

(10) Patent No.: US 11,117,638 B2
(45) Date of Patent: Sep. 14, 2021

(54) BICYCLE FRAME COMPRISING AN ANTENNA

(71) Applicant: BikeFinder AS, Stavanger (NO)

(72) Inventors: Ole Martin Ølmheim, Stavanger (NO); Leif André Skare, Hafrsfjord (NO)

(73) Assignee: BikeFinder AS, Stavanger (NO)

( * ) Notice: Subject to any disclaimer, the term of this patent is extended or adjusted under 35 U.S.C. 154(b) by 443 days.

(21) Appl. No.: 16/096,802

(22) PCT Filed: Apr. 26, 2017

(86) PCT No.: PCT/NO2017/050102
§ 371 (c)(1),
(2) Date: Oct. 26, 2018

(87) PCT Pub. No.: WO2017/188824
PCT Pub. Date: Nov. 2, 2017

(65) Prior Publication Data
US 2021/0221464 A1   Jul. 22, 2021

(30) Foreign Application Priority Data
Apr. 29, 2016 (NO) .................................. 20160723

(51) Int. Cl.
*B62K 19/40* (2006.01)
*B62J 45/40* (2020.01)
(Continued)

(52) U.S. Cl.
CPC .............. *B62K 19/40* (2013.01); *B62J 45/40* (2020.02); *B62K 19/02* (2013.01); *G01S 5/02* (2013.01); *G01S 19/19* (2013.01); *G01S 2205/08* (2020.05)

(58) Field of Classification Search
CPC .......... B62H 5/20; B62K 19/40; B62K 19/02; G01S 5/02; G01S 19/19; G01S 2205/08; B62J 45/40; H04B 7/145; H04W 4/02
See application file for complete search history.

(56) References Cited

U.S. PATENT DOCUMENTS 4,900,048 A   2/1990   Derujinsky
5,955,965 A * 9/1999   Calandruccio .......... B60R 25/33
                                                  340/8.1
(Continued)

FOREIGN PATENT DOCUMENTS

CN   203497063   3/2014
JP   2003306186   10/2003
(Continued)

OTHER PUBLICATIONS

Norwegian Search Report, Norwegian Patent Application No. 20160723, date of report Nov. 4, 2016.
(Continued)

*Primary Examiner* — An T Nguyen
(74) *Attorney, Agent, or Firm* — Andrus Intellectual Property Law, LLP

(57) ABSTRACT

A bicycle frame includes an antenna and is formed with the antenna as an integrated part of the frame structure, and the antenna constituting part of the outside of the bicycle frame. In a method of equipping a bicycle frame made from carbon with an antenna, the antenna is interwoven with the carbon structure of the bicycle frame as part of the production of the bicycle frame.

16 Claims, 3 Drawing Sheets

(51) Int. Cl.
    *B62K 19/02*       (2006.01)
    *G01S 5/02*        (2010.01)
    *G01S 19/19*      (2010.01)

(56) References Cited

U.S. PATENT DOCUMENTS

| | | | |
|---|---|---|---|
| 10,654,537 B2* | 5/2020 | Johnson | H04W 4/48 |
| 2009/0079542 A1* | 3/2009 | Heinl | G06K 19/07771 |
| | | | 340/10.1 |
| 2013/0065530 A1* | 3/2013 | Gansen | H04L 12/66 |
| | | | 455/41.2 |
| 2013/0150028 A1* | 6/2013 | Akins | H04W 4/021 |
| | | | 455/427 |
| 2013/0238238 A1* | 9/2013 | Hsuan | B62K 19/16 |
| | | | 701/468 |
| 2014/0102237 A1* | 4/2014 | Jordan | B62J 99/00 |
| | | | 74/473.12 |
| 2014/0109631 A1 | 4/2014 | Asquith et al. | |
| 2015/0259025 A1* | 9/2015 | Sala | B62K 23/06 |
| | | | 74/473.12 |
| 2016/0129960 A1* | 5/2016 | Akins | B62H 5/20 |
| | | | 340/427 |
| 2016/0311491 A1* | 10/2016 | Watarai | H05B 47/19 |
| 2017/0012455 A1* | 1/2017 | Kato | B62M 9/122 |
| 2017/0099094 A1* | 4/2017 | Gluck | H04B 1/3822 |
| 2017/0101162 A1* | 4/2017 | Tachibana | B62M 25/08 |
| 2020/0231236 A1* | 7/2020 | Johnson | B62H 5/20 |

FOREIGN PATENT DOCUMENTS

| | | |
|---|---|---|
| WO | 2009010065 | 1/2009 |
| WO | 2016034957 | 3/2016 |

OTHER PUBLICATIONS

Written Opinion, PCT/NO2017/050102, date of completion Jul. 10, 2017.
International Search Report, PCT/NO2017/050102, dated Jul. 11, 2017.
International Preliminary Report on Patentability, date of completion Jul. 20, 2018.
The Extended European Search Report fpr Corresponding EP Patent Application No. 17789990.3, dated Oct. 24, 2019.
Art. 94(3) EPC communication fpr Corresponding EP Patent Application No. 17789990.3, dated Jun. 21, 2021.

* cited by examiner

BICYCLE FRAME COMPRISING AN ANTENNA

CROSS-REFERENCE TO RELATED APPLICATIONS

This application is the U.S. national stage application of International Application PCT/NO2017/050102, filed Apr. 26, 2017, which international application was published on Nov. 2, 2017, as International Publication WO 2017/188824 in the English language. The International Application claims priority of Norwegian Patent Application No. 20160723, filed Apr. 29, 2016. The international application and Norwegian application are both incorporated herein by reference, in entirety.

FIELD

The present invention relates to a bicycle frame comprising an antenna.

BACKGROUND

Thefts of bicycles are a considerable and increasing problem. The problem hits anybody from ordinary cyclists and their relatively inexpensive utility bicycles to professional cyclists and their very expensive racing bicycles. A possible countermove is to install tracking units in the bicycles. Such a tracking unit in a bicycle may help in discovering earlier any unwelcome carrying-off of the bicycle, and/or in making it possible to track down a bicycle carried off.

Tracking units in bicycles that use a GPS and/or GSM are known. US2013150028 has addressed the challenge connected with arranging for communication by suggesting configuring the bottle rack of the bicycle to include an antenna. This solution has some weaknesses. The most obvious problem is that not all bicycles are equipped with bottle racks. In some cases, a bottle rack is impractical, for example for downhill bikes. In other cases, a bottle rack may be undesirable for aesthetic reasons. Another problem is that, in many cases, an external unit like that may easily be put out of play.

Producing bicycle frames from carbon, wherein the frame is formed with electronic components or for receiving electronic components, is also known from before. US2013238238 discloses such a carbon frame, in which a lead and/or electronic equipment is integrated within a bicycle frame consisting of tubes of carbon fibre during the manufacturing of the bicycle frame. This is done primarily to avoid damaging the carbon structure of the frame by a subsequent installation of such equipment. The patent document US2013238238 further discloses that the carbon frame may include an antenna lying in, understood as inside, one of several carbon tubes of which the carbon frame consists. It is also disclosed that the frame may include a tracking system, with an antenna, but in this case, too, with the antenna placed inside the carbon frame. An antenna inside a carbon frame is problematic, as the carbon frame will interfere with signal transmission to and/or from the antenna.

SUMMARY

The invention has for its object to remedy or reduce at least one of the drawbacks of the prior art or at least provide a useful alternative to the prior art.

The object is achieved through the features that are specified in the description below and in the claims that follow.

In a first aspect, the invention relates to a bicycle frame including an antenna, wherein the bicycle frame is formed with the antenna as an integrated part of the frame structure, and the antenna constitutes a part of the outside of the bicycle frame, wherein the bicycle frame consists, at least in part, of carbon, and the antenna comprises an antenna element and an intermediate material for creating distance between the carbon of the bicycle frame and the antenna element. The fact that the bicycle frame has the antenna on the outside is essential to the function of the antenna, which is to communicate wirelessly with an external transmitter and/or receiver.

The bicycle frame may include a plurality of antennas.

By "the bicycle frame being formed with the antenna as an integrated part of the frame structure" is meant that the bicycle frame is produced with the antenna as part of a frame unit, and not that the antenna is an element that is fitted to the frame afterwards. The purpose of this is primarily that it is not going to be a simple or favourable alternative for a bicycle thief to remove the antenna from the bicycle, as this, as a part of the frame structure, cannot be removed without the structure being destroyed in a manner that will affect the carrying capacity and/or aesthetics of the bicycle frame.

The antenna may be adapted for communication with a system for determining its own position. Further, the antenna may be adapted for communicating information on the position to a receiver. The antenna may be adapted for tracking the bicycle frame so that, for example, the owner, insurance company or the police can read the position of the bicycle frame, by the antenna being able to receive information on the position from a remote system for determining the position, such as a GPS, and transmit information to a remote receiver, such as a smartphone. The antenna may be an antenna for tracking the positon of the bicycle frame in real time.

Carbon is a favourable material for bicycle frames, because it is light in weight, structurally strong and also has resilience properties which make the frame help to absorb bumps in the surface during use.

A bicycle frame consisting, at least partially, of carbon may be formed with the antenna attached to the frame by one or more of the carbon fibres of the frame having been interwoven with the antenna. Such a carbon-interweaving of the antenna will ensure that it becomes part of the frame structure, that removal of the antenna will be demanding and that removal of the antenna will be at the expense of the carrying capacity and/or aesthetics of the frame structure.

The antenna comprises a plurality of parts, wherein one of these parts is the actual antenna element—the one that is used to emit and/or receive signals—and another part is an intermediate material. The intermediate material is beneficial, especially in cases in which the frame otherwise consists at least partially of carbon, as signal transmission to and/or from the antenna element may be disturbed by the proximity to carbon. The intermediate material is then, typically, meant to be placed between the antenna element and a part of the frame consisting of carbon to create distance between the antenna element and the carbon material. This distance may advantageously be in the interval of 2-8 millimetres; even more advantageously, it may be in the interval of 3-7 millimetres, or, even more advantageously, it may be in the interval of 4-6 millimetres. Typically, the distance may be 5 millimetres, for example. The intermediate material may typically be plastic, or it may be epoxy, a polymer, ceramic or glass.

The antenna may comprise a plurality of antenna elements for transmitting and/or receiving signals. Each antenna element may be adapted for use in a communication system. For example, the antenna may comprise two antenna elements, one antenna element thereof being arranged for GPS signals and the other antenna element being arranged for GSM signals.

The bicycle frame may further include a camouflaging material covering the antenna, at least partially. This camouflaging material may be a layer of enamel or paint, or a film of a material serving the purpose, for example plastic. The purpose of the camouflaging material may be to make the antenna invisible or at least less visible than it would have been without the camouflaging material. It is advantageous that the material will not have a disturbing effect on the antenna signals.

The bicycle frame may be formed with a hole in connection with the antenna to receive a wire which may extend from an inside of the bicycle frame to the antenna. By this is meant that the frame is formed with a passage for a wire to the antenna element from the inside of the bicycle frame. The hole, or passage, may be such that it is not a through hole in the bicycle frame, but that the antenna element forms an end of the hole.

The antenna may be placed in a recess in the rest of the structure of the frame so that the antenna, with all its elements, will not constitute a raised part relative to the rest of the frame structure. The recess in the frame may be smaller than the thickness of the antenna, so that the antenna constitutes a limitedly raised part relative to the rest of the frame structure. The antenna may also be placed in such a way that it lies substantially on the outside of the rest of the frame, so that the antenna constitutes a raised part relative to the rest of the frame structure, substantially equal to the thickness of the antenna. The thickness of the antenna will typically be the sum of the thickness of the intermediate material, the thickness of the antenna element and the thickness of the camouflaging layer.

Further, the bicycle frame may include a tracking system. The tracking system may be placed inside the bicycle frame. The tracking system may comprise a tracking unit, for example a GPS or GSM unit, a wire, and an energy source. The energy source may supply the tracking unit with energy. The wire may extend from the tracking unit to the antenna element in the bicycle frame, via the hole in connection with the antenna. The tracking system may comprise both a GPS unit and a GSM unit.

In a second aspect, the invention relates to method of equipping a bicycle frame made from carbon with an antenna, by the antenna being interwoven with the carbon structure of the bicycle frame as part of the production of the bicycle frame. The antenna may be an antenna for tracking the bicycle frame, by the antenna being adapted for communication with a system for position-finding, for example a GPS, and a receiver of position data, for example a smartphone.

When it is specified that the antenna is interwoven with the carbon structure of the bicycle frame, it may mean that the carbon fibres have been interwoven with the intermediate material of the antenna.

Part of the production process of a carbon frame is curing, typically taking place at approximately 300° C. This is too high a temperature for temperature-sensitive elements. It is therefore advantageous if parts of the antenna are fitted after curing. The intermediate material which is interwoven with the carbon structure of the frame may typically be adapted for receiving one or more antenna elements, and possibly other relevant temperature-sensitive components, for example wires, later in the production process.

After curing has been completed and temperature-sensitive components have been fitted, a material may typically be placed over the antenna, before the entire bicycle frame is enamelled.

BRIEF DESCRIPTION OF THE DRAWINGS

In what follows, examples of preferred embodiments are described, which are illustrated in the accompanying drawings, in which.

DETAILED DESCRIPTION OF THE DRAWINGS

Figure 1:
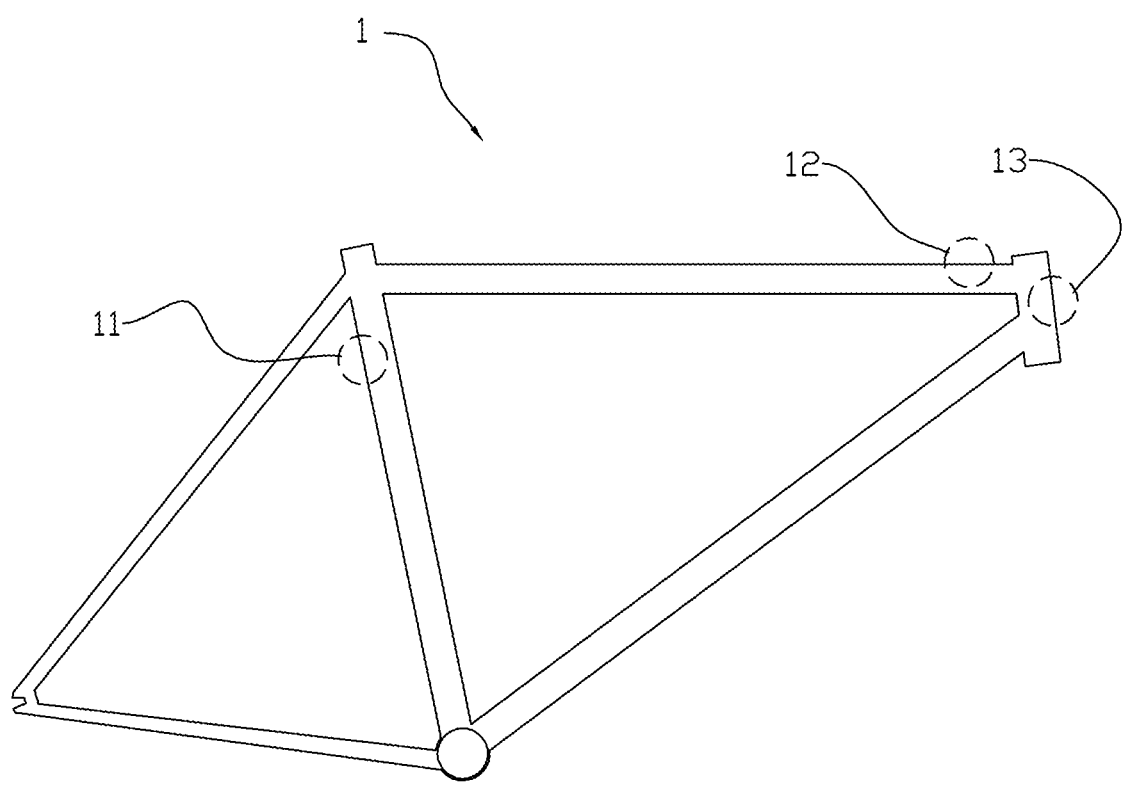
FIG. 1 shows a bicycle frame with markings for examples of advantageous antenna positions.

FIG. 1 is a schematic drawing of a bicycle frame 1 with broken circles marking examples of advantageous antenna positions 11, 12, 13. The advantageous antenna positions 11, 12, 13 shown in the drawing are the back of the upper part of the seat tube 11, the upper side of the forward part of the top tube 12, and the front of the head tube 13. Generally put, it is advantageous for the antenna to be given a good angle relative to the surroundings and possible interferences. It is of particular importance that it is not angled down towards the surface cycled on.

Figure 2:
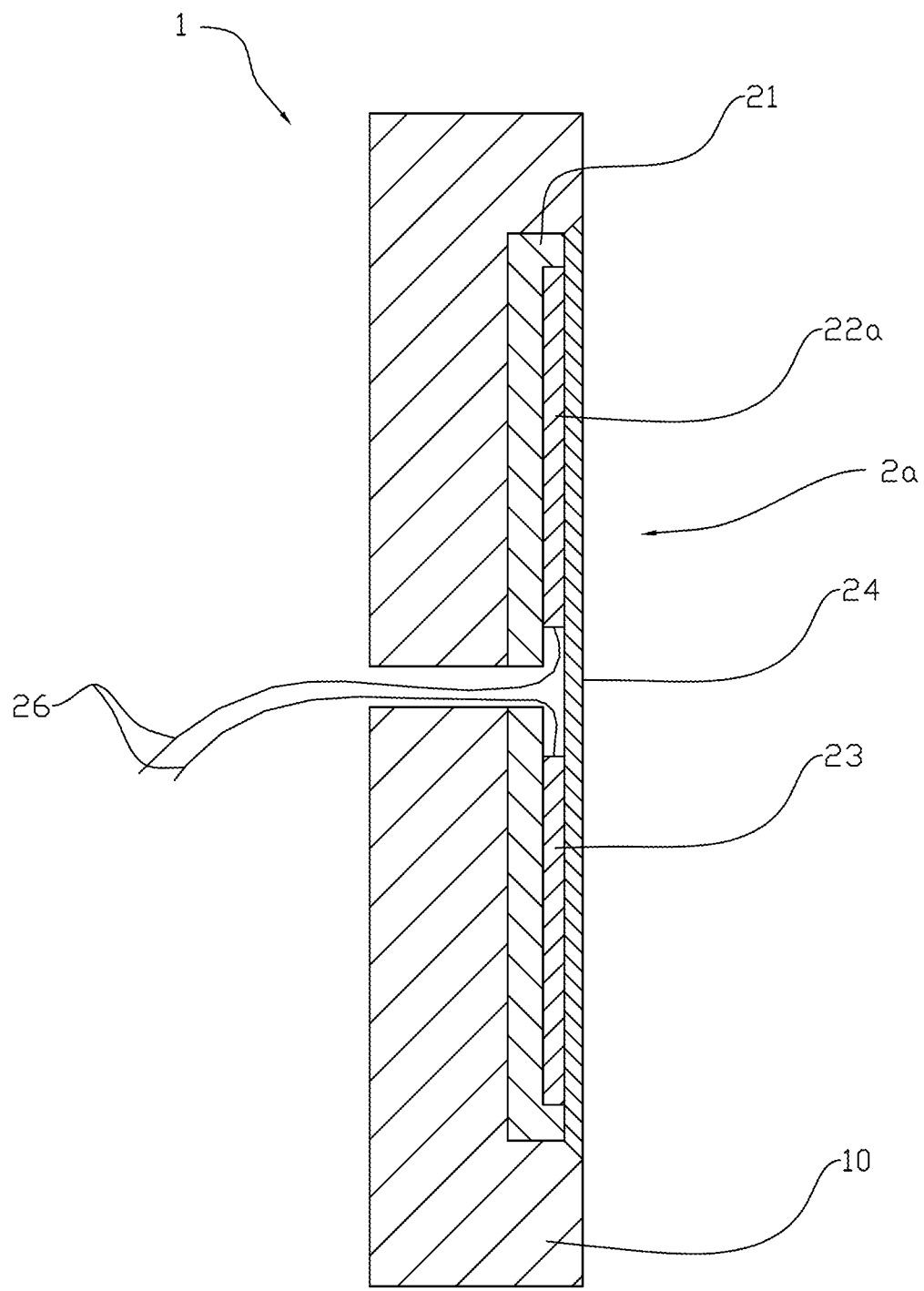
FIG. 2 shows a cross section of a frame with an antenna, the antenna not constituting a raised part relative to the surrounding frame structure.

FIG. 2 shows an enlarged cross section of part of a bicycle frame 1 with an antenna 2a, the antenna 2a not constituting a raised part in the bicycle frame 1 relative to the surrounding frame structure 10. The antenna 2a comprises two antenna elements 22a, 23 for GPS and GSM signals, respectively, and an intermediate material 21 for creating distance between the carbon of the bicycle frame 1 and the antenna elements 22a, 23. Further, the antenna 2a includes an outer, camouflaging layer 24, and wires 26 extending from the inside of the frame 1 through a hole in the frame 1 and up to the antenna elements 22a, 23. The wires are typically connected, at a first end, to the antenna elements 22a, 23 and connected, at a second end, to a tracking unit (not shown) placed in the inside of the bicycle frame 1. The function of the intermediate material 21 is to prevent the carbon of the frame 1 from interfering with the signal transmission to and/or from the antenna elements 22a, 23. The outer, camouflaging layer 24 primarily has the purpose of hiding the antenna 2a, but may also have a protective effect, for example by protecting the antenna 2a from the weather and other external influences.

Figure 3:
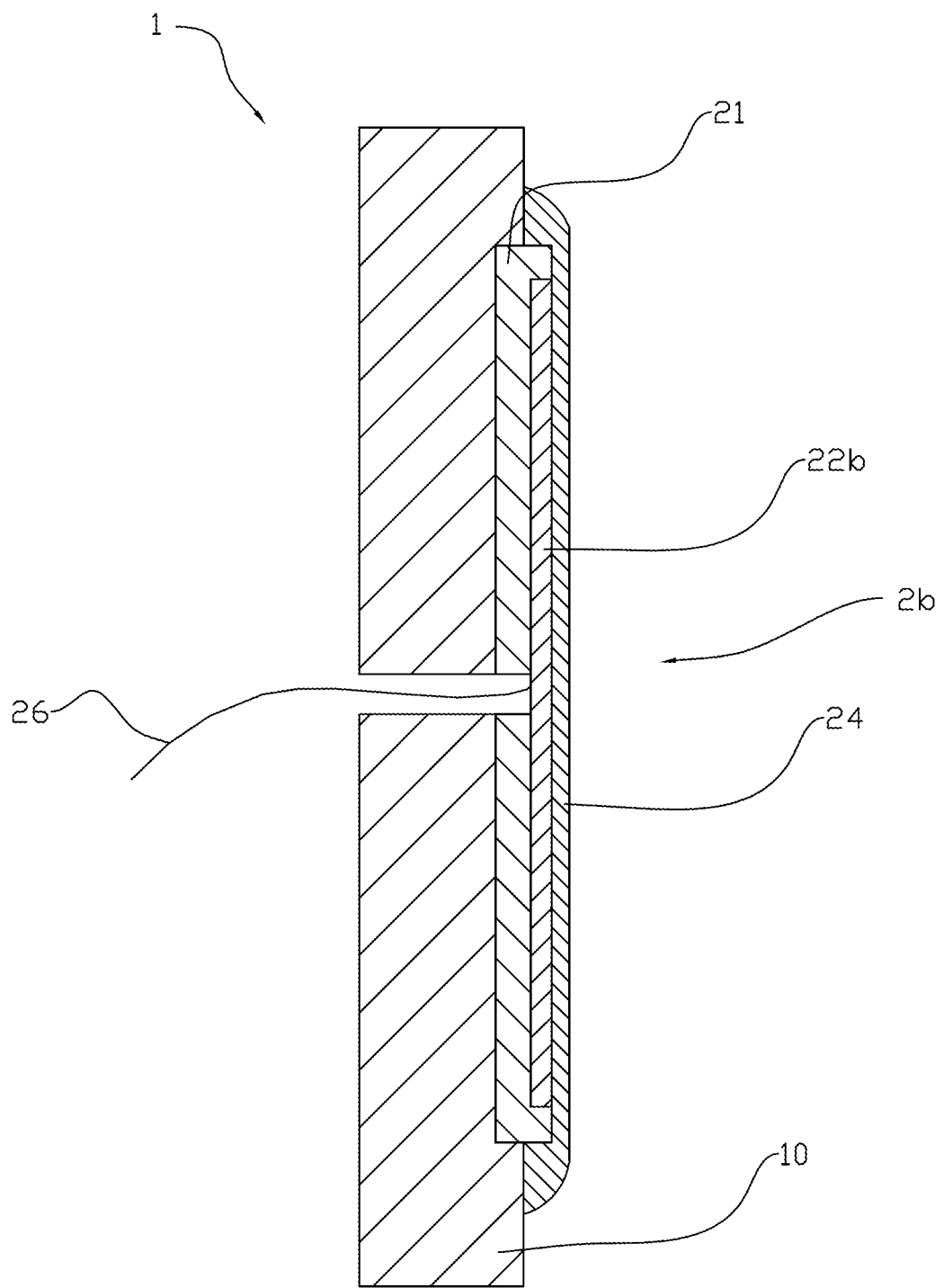
FIG. 3 shows a cross section of a frame with an antenna, the antenna constituting a raised part relative to the surrounding frame structure.

FIG. 3 shows, like FIG. 2b, an enlarged cross section of part of a bicycle frame 1 with antenna 2b, but the antenna 2b constitutes a somewhat raised part in the bicycle frame 1 relative to the surrounding frame structure 10. The antenna 2b comprises an antenna element 22b, a wire 26 extending from the inside of the frame 1 through a hole in the frame 1 to the antenna element 22b, an intermediate material 21 for creating distance between the carbon of the bicycle frame 1 and the antenna element 22b. Further, the antenna 2b includes an outer, camouflaging layer 24.

It should be noted that all the above-mentioned embodiments illustrate the invention, but do not limit it, and persons skilled in the art may construct many alternative embodiments without departing from the scope of the attached claims. In the claims, reference numbers in brackets are not to be regarded as restrictive.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A bicycle frame comprising an antenna, wherein:
   the bicycle frame is formed with the antenna as an integrated part of the frame structure; and
   the antenna constitutes a part of the outside of the bicycle frame,
   wherein the bicycle frame consists, at least in part, of carbon; and
   the antenna comprises an antenna element and an intermediate material for creating distance between the carbon of the bicycle frame and the antenna element;
   wherein the bicycle frame in connection with the antenna is formed with a hole for receiving a wire which may extend from an inside of the bicycle frame to an antenna element.

2. The bicycle frame according to claim 1, wherein the antenna is fixed to the bicycle frame by carbon fibers having been interwoven with the antenna.

3. The bicycle frame according to claim 1, wherein the antenna comprises a plurality of antenna elements.

4. The bicycle frame according to claim 1, wherein the bicycle frame includes a camouflaging material covering the antenna, at least partially.

5. The bicycle frame according to claim 1, wherein the bicycle frame includes a tracking system placed inside the bicycle frame, the tracking system including a tracking unit, a wire and an energy source, and the tracking unit being connected to the antenna by means of a wire.

6. The bicycle frame according to claim 1, wherein the antenna is an antenna for tracking the bicycle frame.

7. The bicycle frame according to claim 2, wherein the bicycle frame includes a camouflaging material covering the antenna, at least partially.

8. The bicycle frame according to claim 3, wherein the bicycle frame includes a camouflaging material covering the antenna, at least partially.

9. The bicycle frame according to claim 2, wherein the bicycle frame includes a tracking system placed inside the bicycle frame, the tracking system including a tracking unit, a wire and an energy source, and the tracking unit being connected to the antenna by means of a wire.

10. The bicycle frame according to claim 3, wherein the bicycle frame includes a tracking system placed inside the bicycle frame, the tracking system including a tracking unit, a wire and an energy source, and the tracking unit being connected to the antenna by means of a wire.

11. The bicycle frame according to claim 4, wherein the bicycle frame includes a tracking system placed inside the bicycle frame, the tracking system including a tracking unit, a wire and an energy source, and the tracking unit being connected to the antenna by means of a wire.

12. The bicycle frame according to claim 1, wherein the bicycle frame includes a tracking system placed inside the bicycle frame, the tracking system including a tracking unit, a wire and an energy source, and the tracking unit being connected to the antenna by means of a wire.

13. The bicycle frame according to claim 2, wherein the antenna is an antenna for tracking the bicycle frame.

14. The bicycle frame according to claim 3, wherein the antenna is an antenna for tracking the bicycle frame.

15. The bicycle frame according to claim 4, wherein the antenna is an antenna for tracking the bicycle frame.

16. The bicycle frame according to claim 1, wherein the antenna is an antenna for tracking the bicycle frame.

* * * * *